United States Patent
Steer (10) Patent No.: US 9,554,282 B2
(45) Date of Patent: Jan. 24, 2017

(54) APPARATUS AND METHOD FOR SHARING RADIO SPECTRUM RESOURCES AMONG DISPARATE SERVICES

(71) Applicant: BlackBerry Limited, Waterloo (CA)

(72) Inventor: David Steer, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 127 days.

(21) Appl. No.: 13/721,190

(22) Filed: Dec. 20, 2012

(65) Prior Publication Data

US 2014/0179336 A1 Jun. 26, 2014

(51) Int. Cl.
| | |
|---|---|
| *H04W 24/00* | (2009.01) |
| *H04W 16/14* | (2009.01) |
| *H04W 4/02* | (2009.01) |
| *H04W 48/04* | (2009.01) |

(52) U.S. Cl.
CPC ............ *H04W 16/14* (2013.01); *H04W 4/021* (2013.01); *H04W 48/04* (2013.01)

(58) Field of Classification Search
CPC ....... H04W 8/183; H04W 92/02; H04W 64/00
USPC ............................. 455/432.1–444, 456.1–457
See application file for complete search history.

(56) References Cited

U.S. PATENT DOCUMENTS

| | | | |
|---|---|---|---|
| 6,470,182 B1 | 10/2002 | Nelson | |
| 6,832,093 B1 * | 12/2004 | Ranta .......................... | 455/456.4 |
| 8,265,685 B2 * | 9/2012 | Vikberg et al. ................ | 455/525 |
| 2009/0305666 A1 | 12/2009 | Tian et al. | |
| 2012/0122477 A1 * | 5/2012 | Sadek .................... | H04W 16/14 455/456.1 |
| 2013/0217390 A1 * | 8/2013 | Alizadeh-Shabdiz et al. .......................... | 455/435.2 |
| 2013/0237215 A1 * | 9/2013 | Vashi et al. ................. | 455/432.3 |

FOREIGN PATENT DOCUMENTS

| | | |
|---|---|---|
| EP | 0 830 046 A2 | 3/1998 |
| EP | 0 998 159 A1 | 5/2000 |
| WO | WO 2010/071509 A1 | 6/2010 |

OTHER PUBLICATIONS

European Search Report dated Jun. 25, 2013.
PCT International Search Report and Written Opinion in PCT Application No. PCT/CA2013/050996 dated Mar. 5, 2014.

* cited by examiner

*Primary Examiner* — Vladimir Magloire
*Assistant Examiner* — Juan C Perez Tolentino
(74) *Attorney, Agent, or Firm* — Conley Rose, P.C.; J. Robert Brown, Jr.; Albert A. Abbou (57) ABSTRACT

A method for use in mobile station. The method comprises detecting a special code transmitted by first base station, wherein the special code is associated with a border of a restricted area. The method further comprises, in response to detection of the transmitted special code, determining a position of the mobile station and comparing the position of the mobile station to the border of the restricted area. The method also comprises determining whether the mobile station is in the restricted area or a permitted area.

20 Claims, 8 Drawing Sheets

APPARATUS AND METHOD FOR SHARING RADIO SPECTRUM RESOURCES AMONG DISPARATE SERVICES

TECHNICAL FIELD OF THE INVENTION

The present application relates generally to techniques for sharing radio spectrum and, more specifically, to techniques for sharing radio spectrum among disparate radio services without the need for large protection zones.

BACKGROUND OF THE INVENTION

In the current regulatory schemes, radio frequency (RF) channels are typically exclusively assigned to specific services. That is, frequency channels are exclusively assigned to an individual carrier for a large territory of operation. To facilitate more efficient use of spectrum, future systems are being developed that permit the sharing of spectrum resources among multiple services. In these new arrangements, the different allocations of RF spectrum may have less spatial separation. As a result, the same RF spectrum may be used by one carrier in a first area and by another carrier in a second area close to the first area. There may also be arrangements in which RF channels are available in some areas or times of day, but not available in other areas or times. Current spectrum arrangements often require a large unused protection zone between the service areas to ensure the signals from one carrier or service do not interfere with another. This large unused zone is undesirable as it represents area where services are not available to users and some of the spectrum in the protection area is wasted. It would be advantageous to have a method and apparatus to coordinate the efficient usage of spectrum among different services in adjacent areas that does not require large unused protection zones.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present disclosure provides systems and methods that permit the sharing of spectrum radio frequency (RF) channel resources among disparate services without the need for large protection zones between the areas of service of different carriers. The disclosed systems and methods enable mobile network user devices (which may also be referred to as mobile stations) to operate co-channels in close proximity to sensitive receivers of other services, coordinates co-channel operations of different services along national border regions, and facilitates operation of mobile services within mobile platforms (such as aircraft, ships and trains).

According to the principles of the present disclosure, base stations that provide coverage near the boundaries of different operating regions transmit special codes. A mobile device recognizes the codes from a base station and compares its location (using GPS or other suitable location technology) with the allowed area. If operation is permitted at its location, the mobile device accesses the mobile network using restricted channels and may optionally reduce transmitter power to help control interference. If access is not permitted at its location, the mobile device does not access the base station using the restricted channels. In some instances, the mobile device may make communications using other (unrestricted) channels or wait until it is in a location in which operation is permitted. Thus, the transceivers of the alternate service are protected from interference from the other sharing service.

According to the principles of the present disclosure, the transmitter of a mobile device will not operate when the mobile device is too close to a sensitive receiving station of another service. Also, the transmitter of a mobile device will not operate when the mobile device is too close to a national border and hence may interfere with services in a neighboring jurisdiction (or country). In another example, the transmitter of mobile device on a moving platform will operate only with the base station(s) associated with the moving platform (e.g., train, bus, ship, airplane) and not be distracted by other base stations that the mobile device passes.

In the geographic area of a base station sending the special transmission codes, a mobile device that is not equipped to receive the special codes and check its location will not recognize the special codes transmitted by the base stations and so will not operate its transmitter, since the mobile will determine that it is outside a suitable coverage region. Thus, the service in the adjacent network (or alternate service transceiver) is protected from wayward transmissions of mobile devices.

Figure 1:
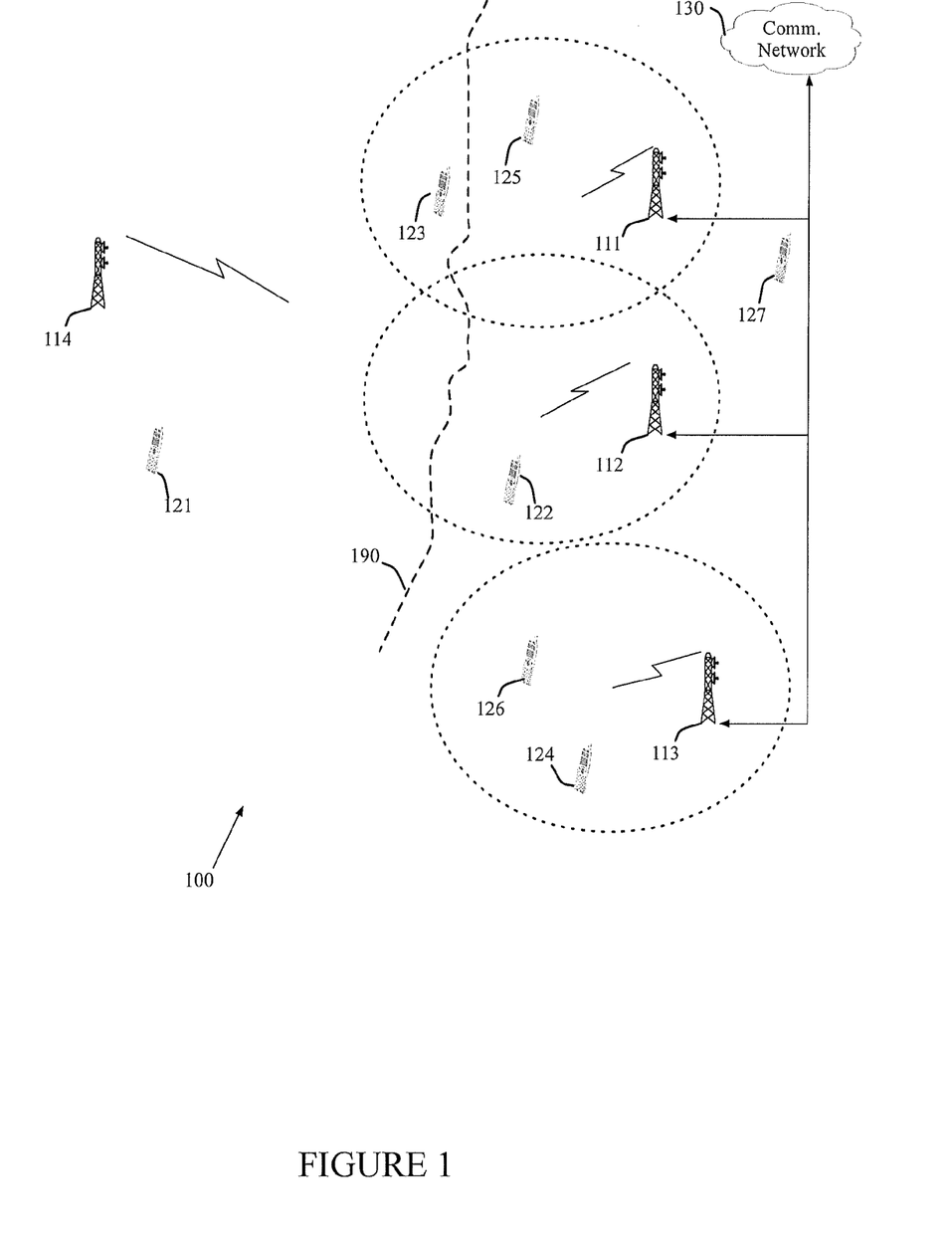
FIG. 1 illustrates an exemplary network according to one embodiment of the present disclosure.

FIG. 1 illustrates exemplary network 100 according to one embodiment of the present disclosure. Wireless network 100 comprises base station (BS) 111, base station (BS) 112, and base station (BS) 113, which are operated by the same carrier. BS 111, BS 112 and BS 113 are connected by backhaul facilities (e.g. wireline, fiber, wireless) to communication network 130. Communication network 130 may be, for example, a circuit-switched network or a packet-based network, such as the Internet. Base station (BS) 114 is an alternate service transceiver operated by a different carrier and may share at least part of the same spectrum (i.e., RF channels) as one or more of BS 111, BS 112, or BS 113. The coverage area of BS 111 is indicated by a dotted-line oval in which BS 111 is located. Similarly, the coverage areas of BS 112 and BS 113 are indicated by dotted-line ovals.

BS 111, BS 112, BS 113 and BS 114 are configured to communicate with a plurality of mobile stations. BS 111 communicates with MS 123 and MS 125. BS 112 communicates with MS 122. BS 113 communicates with MS 124 and MS 126. MS 121 is outside the coverage areas of BS 111, BS 112 and BS 113.

Border 190 is depicted by a dotted line that cuts through the coverage zones of BS 111 and BS 112. The alternate service system (i.e., BS 114) may include a sensitive receiver (for example, a satellite ground-station) or may be part of a wireless network operating in another jurisdiction (e.g., another country) with different channel plans and distribution than wireless network 100. In such a scenario, BS 111-113 may be configured so that their transmissions do not interfere with BS 114, either because of physical location or choice of channel frequency). Border 190 represents the line where transmissions from mobile devices closer to BS 114 may interfere with BS 114 and transmissions from mobile devices further from BS 114 will not interfere.

The alternate service transceiver (i.e., BS 114) may, for example, be a powerful RADAR system whose emissions may, within the coverage region, interfere with the operation of mobile devices in addition to the possibility of the mobile device transmissions interfering with the RADAR receiver. In this example, border 190 may also represent the line within which the alternate service transceiver may block operation of the mobile system and thus it is desirable to exclude mobile operation in the region, as it will be unreliable (at best).

For convenience, the illustration of FIG. 1 shows each of base stations 111, 112 and 113 with a single surrounding coverage zone or cell indicated by the dotted-line oval. In many practical deployments a base station (or access point) often serves multiple sectors or areas focused in different directions from the base station. The disclosed systems and methods work equally well for those configurations with the sector being equivalent to a cell in these descriptions.

BS 111 and BS 112 are located close to border 190 and are configured to transmit special codes according to the principles of the present disclosure. BS 113 is not located close to border 190 and need not be configured to transmit special codes according to the principles of the present disclosure. In one embodiment, MS 122, MS 123 and MS 126 are configured to detect and process the special codes and act on those instructions and are also capable of receiving normal transmission codes from base stations and acting accordingly. MS 121, MS 125, MS 124 and MS 127 are not configured to detect and process the special codes.

Figure 2:
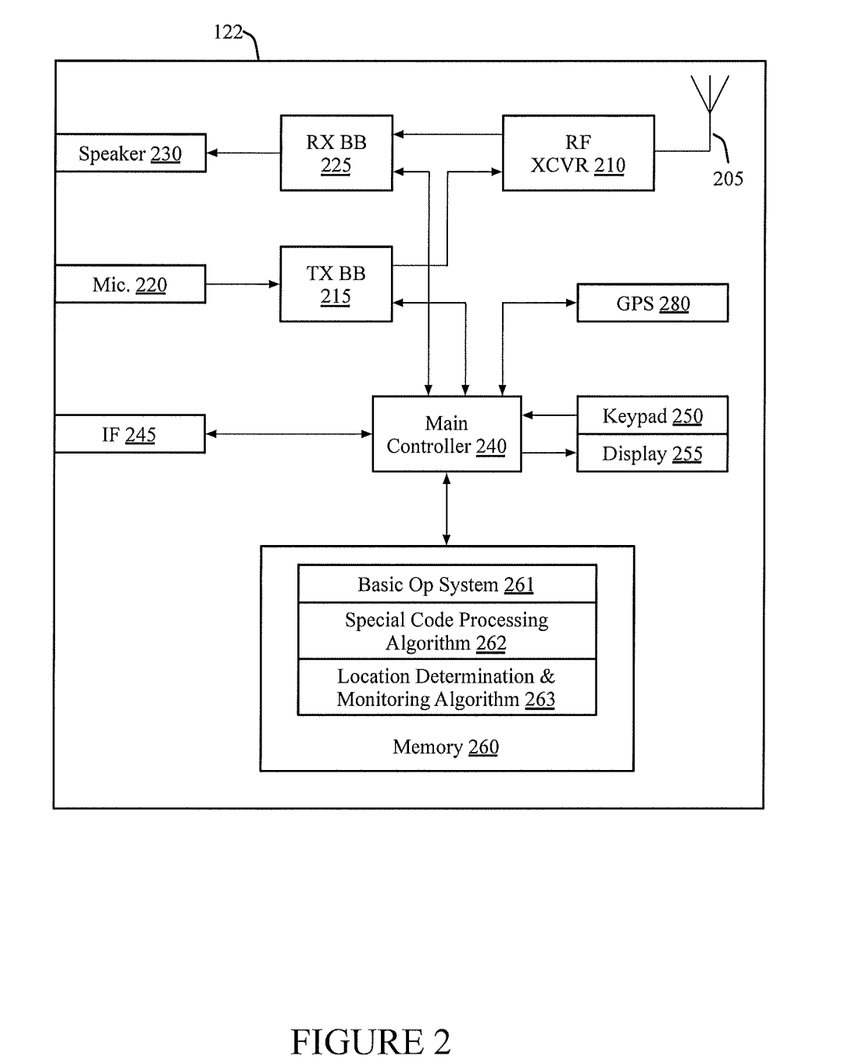
FIG. 2 illustrates an exemplary mobile station according to one embodiment of the present disclosure.

FIG. 2 illustrates exemplary mobile station (MS) 122 according to the present disclosure. MS 122 comprises at least one antenna 205, radio frequency (RF) transceiver (XCVR) 210, transmitter baseband (TX BB) processing circuitry 215, microphone 220, and receiver baseband (RX BB) processing circuitry 225. MS 122 also comprises speaker 230, main controller 240, input/output (I/O) interface (IF) 245, keypad 250, display 255, memory 260, and global positioning system (GPS) receiver 280. Memory 260 stores basic operating system (OS) program 261, special code processing algorithm 262, location determination and monitoring algorithm 263, and other data (not shown).

Radio frequency transceiver 210 receives from antenna 205 an incoming RF signal transmitted by a base station of wireless network 100. Radio frequency transceiver 210 comprises receiver circuitry configured to operate in cells associated with one or more types of radio access technology (RAT) networks (e.g., GSM, UTRAN, E-UTRAN, etc.). Radio frequency transceiver 210 down-converts the incoming RF signal to produce an intermediate frequency (IF) or a baseband signal. The IF or baseband signal is sent to RX BB processing circuitry 225, which may produce a processed baseband signal by, for example, filtering and digitizing the received baseband or IF signal, additional filtering, and, if necessary, demodulation and/or decoding. Receiver baseband (RX BB) processing circuitry 225 transmits the processed baseband signal to speaker 230 (i.e., voice data) or to main controller 240 for further processing (e.g., web browsing).

Transmitter baseband (TX BB) processing circuitry 215 may receive analog or digital voice data from microphone 220 or other outgoing baseband data (e.g., web data, e-mail, interactive video game data) from main controller 240. TX BB processing circuitry 215 may encode, modulate, multiplex, and/or digitize the outgoing baseband data to produce a processed baseband or IF signal. Radio frequency transceiver 210 receives the outgoing processed baseband or IF signal from TX BB processing circuitry 215. Radio frequency transceiver 210 up-converts the baseband or IF signal to a radio frequency (RF) signal that is transmitted via antenna 205.

Main controller 240 may comprise any device, system or part thereof that controls at least one operation. Such a device may be implemented in hardware, firmware or software, or some combination of at least two of the same. Main controller 240 is a microprocessor or a microcontroller. Memory 260 is coupled to main controller 240. Part of memory 260 may comprise a random access memory (RAM) and another part of memory 260 may comprise a non-volatile memory, such as Flash memory.

Main controller 240 executes basic operating system (OS) program 261 stored in memory 260 in order to control the overall operation of MS 122. In one such operation, main controller 240 controls the reception of forward channel signals and the transmission of reverse channel signals by radio frequency transceiver 210, RX BB processing circuitry 225, and TX BB processing circuitry 215, in accordance with well-known principles.

Main controller 240 is capable of executing other processes and programs resident in memory 260. Main controller 240 can move data into or out of memory 260, as required by an executing process. Main controller 240 is also coupled to I/O interface 245. I/O interface 245 provides MS 122 with the ability to connect to other devices, such as laptop computers and handheld computers. I/O interface 245 is the communication path between these accessories and main controller 240. Main controller 240 may also be coupled to an input device, such as keypad 250, and display 255. The operator of MS 122 uses keypad 250 to enter data into MS 122. Display 255 may be a liquid crystal display capable of rendering text and/or at least limited graphics from web sites. Alternate examples may use other types of displays (or none). Display 255 may include a touch screen input device, which may be used in conjunction with, or in place of, keypad 250. Main controller 240 is further configured to communicate with GPS receiver 280 and to request position or location information according to the principles of the present disclosure.

MS 122 is configured to receive and process special codes transmitted by BS 111 and BS 112 according to the principles of the present disclosure. Main controller 240 executes special code processing algorithm 262 and location determination and monitoring algorithm 263 in order to receive and process the special codes transmitted from the base stations and to determine the location of MS 122 with respect to a defined border area, as further described herein.

Mobile Device Operation Utilizing Special Codes

MS 121 and MS 127 are in locations outside the coverage of BS 111-BS 113 and are unable to receive any of the communications control channels being transmitted by wireless network 100. Consequently, MS 121 and MS 127 determine they are outside the available service regions and do not make any transmissions and will not interfere with the alternate service transceiver (BS 114). If a mobile station in this region was configured to detect the special codes, the mobile station would also not operate on the affected channels, since was outside a coverage region. Thus, the alternate service receiver is always protected against interference from mobile devices in its nearby area where there is no coverage from the network base stations on the protected frequency channels.

Mobile stations 124 and 126 are in the coverage area of BS 113, which does not overlap border 190 of the alternate service transceiver. As such, BS 113 does not transmit the special transmission codes of the invention. MS 124, which is not equipped to receive the special codes, perceives BS 113 to be normal and operates as it normally would when communicating with a base station. MS 126, which is equipped to receive the special codes of the present disclosure, also recognizes the base station to be normal and does not invoke any special actions and communicates with the base station normally. Thus, in areas that are not adjacent or overlapping the protected zone or border, there is no change to the deployment or operation of the mobile network or the mobile stations.

MS 125 is within the coverage area of BS 111, which transmits the special codes according to the present disclosure. Because MS 125 detects but cannot process the special codes, MS 125 determines the signals from BS 111 are not appropriate for MS 125 and does not transmit on the protected channels, considering itself outside the region of coverage.

MS 123 is in the coverage area of BS 111 and is configured to detect and process the special codes sent by BS 111. Thus, MS 123 recognizes the need to further determine the location of MS 123 before transmitting and acquiring service. Upon decoding the special transmission codes, MS 123 determine location or range from BS 111 using GPS receiver 280 or any known technique and compares its location with border 190. MS 123 is on the protected side of border 190 and consequently will not make any transmissions using the protected channels. Thus, the alternate service transceiver (BS 114) is protected from signals from MS 123. To communicate, MS 123 may use other unprotected channels or radio bands that are not protected at its current location. The special codes transmitted by BS 111 may include information on alternative channels that are also protected in the area or suggest alternative bands or services that may be accessible in the region.

MS 122 is in the coverage area of BS 112 and is configured to detect and process the special codes transmitted by BS 112. MS 122 determines its location before activating its transmitter and acquiring service. Upon decoding the special codes, MS 122 determines its location or range from BS 112 using GPS receiver 280 and compares its location with border 190. MS 122 is on the permitted side of border 190 and may transmit to acquire service using the protected channels. Thus, the alternate service receiver (BS 114) is protected from signals from MS 122, since MS 122 is beyond the protected border zone.

Figure 3:
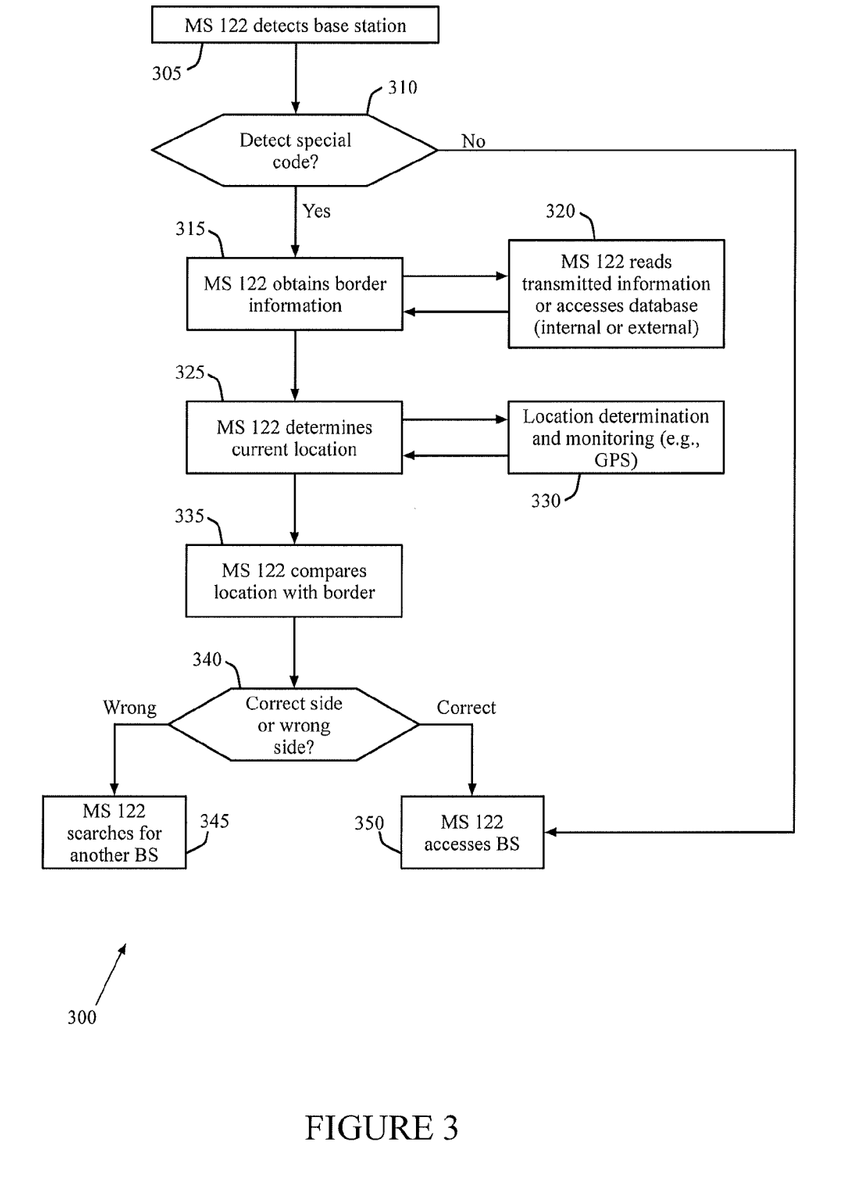
FIG. 3 is a flow diagram illustrating the operation of an exemplary mobile station according to one embodiment of the present disclosure.

FIG. 3 depicts flow diagram 300, which illustrates the operation of an exemplary mobile station according to the present disclosure. Initially, MS 122 detects a base station (step 305). Next, MS 122 determines if the base station is transmitting special codes according to the principles of the present disclosure (step 310). If MS 122 does not detect special codes ("No" in 310), then MS 122 accesses the base station (step 350). If MS 122 does detect special codes ("Yes" in 310), then MS 122 obtains border information (step 315). To do this, MS 122 may read transmitted information from the base station or may accesses an internal or external database (step 320).

Next, MS 122 determines its current location (step 325). MS 122 may perform location determination and monitoring by means of GPS receiver 280 or by other conventional means (e.g., triangulation) (step 330). MS 122 then compares its location with respect to border 190 (step 335) and determines whether MS 122 is on the correct side or the wrong side of border 190 (step 340). If MS 122 determines it is on the correct side, MS 122 access the base station. If MS 122 determines it is on the wrong side, MS 122 searches for another base station.

According to another embodiment of the disclosure, a mobile device operating on a channel that may be restricted also monitors its location and observes when it crosses a border. If a mobile station crosses from an operational to a protected region while operating, the mobile station will take action to stop transmissions on the affected channels and either cease communication or hand over to another suitable channel that is available for use at the current location. This change in protection zone may occur, for example, when the mobile device hands over to another cell or if movement of the mobile station crosses a protected area border. This sequence of operations is illustrated in FIG. 4.

Figure 4:
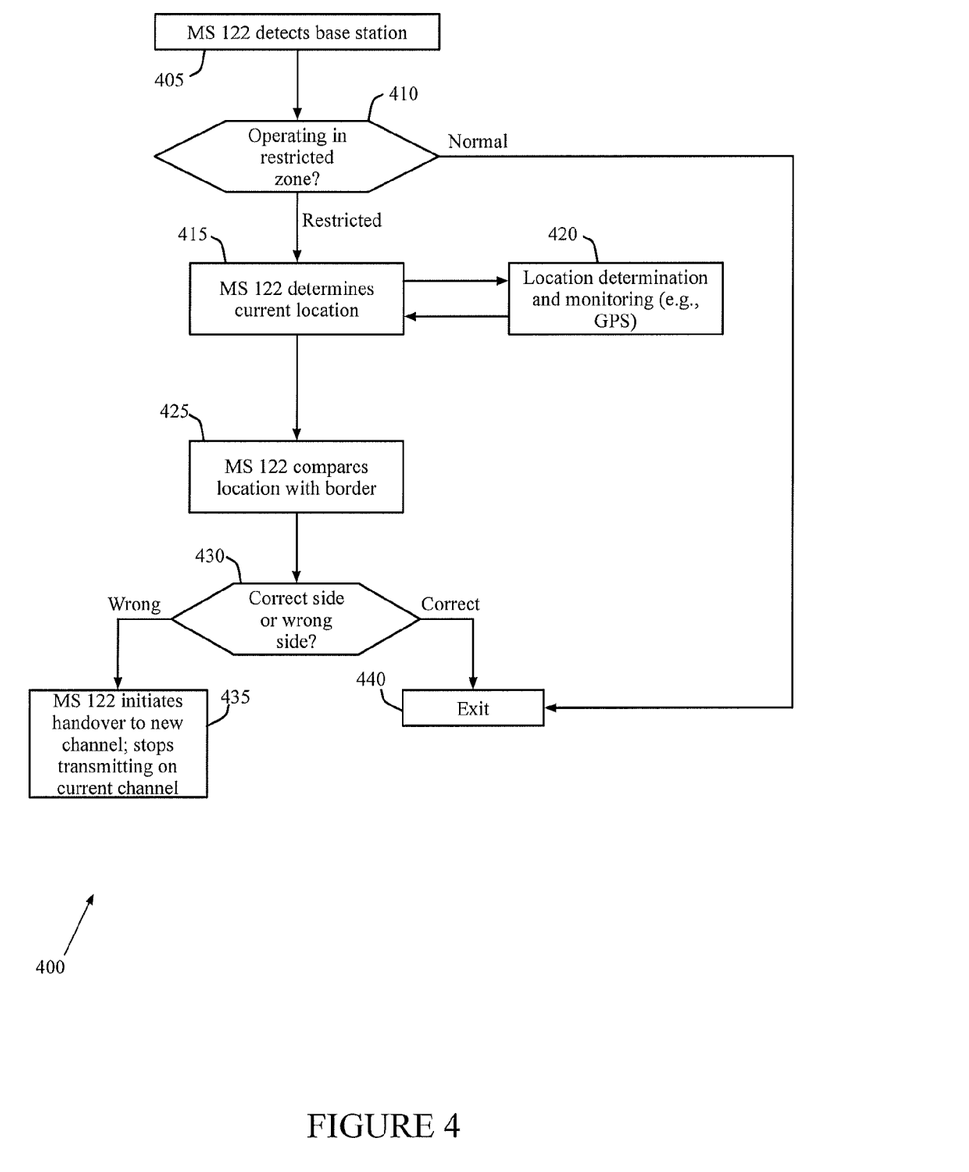
FIG. 4 is a flow diagram illustrating the operation of an exemplary mobile station according to another embodiment of the present disclosure.

FIG. 4 depicts flow diagram 400, which illustrates the operation of exemplary mobile station 122 according to another embodiment of the present disclosure. Initially, MS 122 detects a base station (step 405). Next, MS 122 determines if MS 122 is operating in a restricted area (step 410). If MS 122 is not operating in a restricted area ("Normal" in 410), then MS 122 takes no further action (step 440). If MS 122 is operating in a restricted area, then MS 122 determines its current location (step 415). MS 122 may perform location determination and monitoring by means of GPS receiver 280 or by other conventional means (e.g., triangulation) (step 420). MS 122 then compares its location with respect to border 190 of the restricted area (step 425) and determines whether MS 122 is on the correct side or the wrong side of border 190 (step 430). If MS 122 determines it is on the correct side, MS 122 takes no further action. If MS 122 determines it is on the wrong side, MS 122 initiates handover to a new channel and stops transmitting on the current channel (step 435).

Special Transmission Codes

The special transmission codes may be of several formats. In an exemplary 3GPP system, the cells in the border region may designated as "closed subscriber group" (CSG) cells. These cells would only be accessed by mobile stations whose registration and capability enable them to determine their locations in relation to the border. These mobile devices would, for example, have the CSG stored in the USIM list containing all the CSG identities of the CSGs that are accessible. Mobile devices not configured to handle the closed subscriber group ignore the base station and look for another base station that they are able to access in another location or spectrum band. Mobile devices recognizing the closed subscriber group proceed to camp on the cell. The broadcast system information blocks (e.g. SIB) for the closed subscriber group cell are also extended to include the geographic parameters of the border or may include a pointer to another broadcast channel from the network, or network address that contains the local border information definitions.

In other embodiments, the border protection cells may be restricted for localized service area subscriptions. In these cells only mobile devices that are registered for the service and that are configured to determine their locations in relation to the border camp or register with the cell.

The special codes transmitted by the base stations may also include a geographic description of the border location. In an advantageous embodiment, the base station transmits coordinates representing the end points of the line of the border in its coverage area (or perhaps several connected lines). The transmitted information may also designate which side of the border (east/west or north/south) is the protected zone. A mobile station may then use its locating capabilities, such as a GPS receiver or a TDOA of base station signals or other suitable location techniques (e.g., triangulation), to determine its location on either the protected or unprotected side of the border line.

It is likely that actual deployments will utilize a combination of techniques depending on the details of the border shape and the accuracy required in locating the mobile stations. A mobile station may determine the appropriate location method or may be instructed by the special codes transmitted by the base station as to which location technique to use. This border information may be transmitted as a part of the broadcast cell information that is periodically sent by the base station. In some embodiments, detection of border information in the broadcast transmission is identified as the special code by a mobile station and causes the mobile station to follow the necessary location checks before operating its transmitters. This information may in some embodiments be sent in extensions to the System Information Blocks (SIB) for the affected cells.

A base station may be pre-programmed with the coordinates of the border line or protection area (or equivalent timing advance number) or the appropriate parameters may be contained in a database, provided by the network operator in concert with the alternate service sharing operators. The base station may access the database to learn what parameters to convey in its special transmission codes. In an alternative procedure, a mobile station may communicate with a database using available unprotected channels to learn the border region near its current location. In a further alternative, the mobile station may be pre-programmed with the lines of the various borders and permitted and protected channels for a wide area.

In some cases, the special transmission codes transmitted by a base station may include a simple geographic description of the border location. This simple configuration may provide a range limit from the base station to the nearest borderline. A mobile station may thus easily determine if it is beyond the border by comparing its range from the base station to the range limit. If beyond the limit, the mobile station will not respond to the base station. This simple ranging limit, however, has the disadvantage of blocking transmissions from some mobile stations that are on the safe side of the base station (if it is an omni-directional cell) and hence may be well away from the border region.

The ranging estimates of the distance from mobile to base station may utilize the timing of the signals sent to the base station for synchronization. In many mobile system radio access technology interfaces, the base station instructs the mobile transmitter to advance (or retard) the timing of the transmitted signal to match timing boundaries at the base station receiver. This "timing advance" control of the signals sent by the mobile station is proportional to the "time of flight" of the radio signals to reach the base station from the mobile and thus gives a simple indication of the distance from base station to the mobile station. If the range distance exceeds the closest separation of the base station to the borderline, then the mobile may be in a forbidden operating zone. If the range distance is less than the separation to the border, then the device is in the safe zone. The mobile station may thus monitor its timing advance while operating in a cell of a base station using the special transmission codes. If it exceeds the border range limit, the mobile station either stops using the channel or checks its actual location against the borderline and stops using the channel if the border has been crossed. This procedure may be an advantage for the mobile station to conserve its battery power by not having to operate its location receiving equipment and processing apparatus as frequently.

A difficulty of using the ranging technique, however, is that the mobile station must transmit an uplink signal to obtain its timing advance command. Initiating a network access session using the ranging process thus risks interference with the alternate service transceiver. However, a mobile station starting in a safe location may use the ranging technique and monitor its range while in operation. In some embodiments, the ranging distance may be obtained using transmissions on an alternative channel that is not protected. In that case, the mobile station may start operating on a safe channel and be handed over to one of the protected channels if the range is suitable and the mobile is in a clear operating zone Intersystem Border Coordination Operation The present disclosure may be used to coordinate the operation of disparate systems on each side of a border and prevent interference between them and assure that mobile station traffic is directed to the appropriate network. In some situations, the two systems may be operating in conditions in which the same channel plan and radio access technology is being used by each system. In other situations, however, the channel plans or the radio access technology may be different. For example, one system may be operating its mobile station transmitters on the same frequency channels as the other system is operating its mobile station receivers. In some situations one system may be operating in TDD mode and the other in FDD mode.

Figure 5:
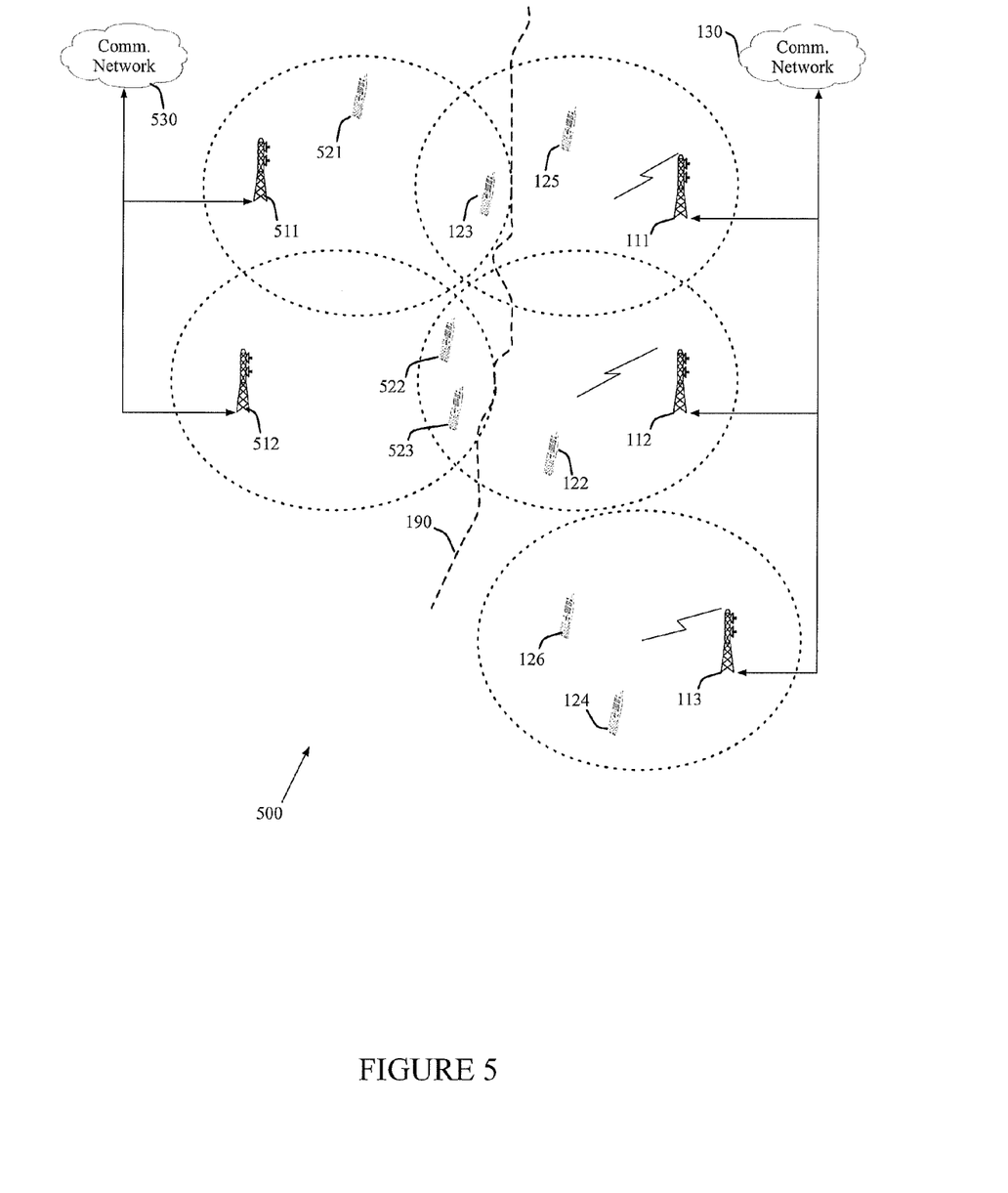
FIG. 5 illustrates dynamic border intersystem coordination according to an embodiment of the present disclosure.

FIG. 5 illustrates dynamic border intersystem coordination according to an embodiment of the present disclosure. Wireless network 500 comprises five base stations operating on different sides of border 190. As in FIG. 1, the same carrier operates base station (BS) 111, base station (BS) 112, and base station (BS) 113. BS 111, BS 112 and BS 113 are connected by a suitable backhaul to communication network 130. On the opposite side of the border, another carrier operates base station (BS) 511 and base station (BS) 512. BS 511 and BS 512 are connected by a suitable backhaul to communication network 530. BS 111, BS 112, BS 511 and BS 512 all use the special transmission codes of the present disclosure.

MS 521 and MS 123 are in the coverage area of BS 511. MS 522 and MS 523 are in the coverage area of BS 512. MS 125 and MS 123 are in the coverage area of BS 111. MS 522, MS 523, and MS 122 are in the coverage area of BS 112. The coverage zones of all network base stations are illustrated as dotted line ovals. The coverage areas are configured to avoid base station to base station interference (i.e., they do not overlap the base station locations) and to generally cut-off at or near border 190, although there is inevitably some overlapping coverage.

If the same channel plan is being used by systems on both sides of border 190, then the base station location and their coverage zones may be deployed to minimize overlap of coverage in the border region. The overlap must be minimized, since the mobile stations will receive signals from two or more base stations on the same channel. The mobile station must then choose which network base station to utilize for service. By using the methods of the present disclosure, the mobile stations may determine which side of the border they are located on and thereby choose the appropriate base station for service. This will generally be the strongest base station of the network serving their side of border 190.

This is illustrated in FIG. 5 where mobile stations 521, 522, and 512 communicate with BS 511 and BS 512 on one side of border 190 and mobile stations 125, 122, and 124 communicate with BS 111, 112 and 113 on the other side of border 190. However, MS 523 does not operate with BS 112 because MS 523 is on the incorrect side of border 190 as determined by its location.

If different channel plans or radio access technologies are being used by systems on each side of the border, then the base station and mobile station operation must be coordinated to prevent excessive interference and to minimize the area of the protection zone along the border. It is a difficult deployment, for example, if the mobile station transmit frequencies of one system overlap the mobile receive frequencies of the other or the TDD time slots overlap. There will then be the possibility of base-to-base and mobile-to-mobile interference.

With traditional deployments, such interference can only be avoided by the provision of a large unused protection zone along the border. By using the methods of the present disclosure, the special codes transmitted by the base stations along the border and the capability of the mobile stations to check their location before operating, the large protection zone can be significantly reduced in area. The base station-to-base station interference may be controlled by careful deployment of the base stations so that they do not directly radiate each other. Antenna placement, beaming, down-tilt, low-elevation and low-power cells are techniques well known in the art to address such fixed station-to-station interference.

To prevent the occurrence of mobile-to-mobile interference, the mobile stations use the special transmission codes of the present disclosure to check their location before operating, and they do not operate unless they are on the appropriate side of the border and sufficiently separated from the location of another mobile using the alternate radio system. As the occurrence of mobile-to-mobile interference is typically limited by radio propagation factors to a few meters (2-5), the protection zone along the border becomes just a few meters in extent. A reduced size of the protection zone can be further helped by a deployment with small cell sizes as this also minimizes the mobile station transmit power (and the BS power too) and thereby limiting the range of mobile-to-mobile interference.

In a further embodiment, the base stations may keep track of the actual locations of mobile stations operating within their system near the border, and exchange such information between systems such that powers and channels are adjusted to minimize interference if two mobile stations are in close proximity. This is illustrated in FIG. 5, where mobile stations 521, 522, 124 and 126 are able to operate in their respective networks as they are within the border and are sufficiently separated from other mobiles. The mobile stations 123 and 125 are restricted from operation, or limited to low power, as they are in close proximity to each other and may interfere.

In some deployment scenarios, particularly in the adjacent coverage areas between the cells sending the special transmission codes and the normal cell that do not use special transmission codes, a mobile station may be located in the special cell, but can hear a normal cell at distant range and so contacts the distant cell. With proper deployment this will not cause interference in the border region as the mobile station will be on the correct side of the border and sufficiently removed from the border not to cause interference to the alternate system. The deployment must thus carefully establish that no normal cells have coverage in the border region, even if this means utilising special transmission code cells at some distance from the border.

In some scenarios for the protection of alternate services or in border regions, the specification of the protection zones may include options for operation of a limited number of mobile stations in the protection region or for operation of the mobile stations at reduced power. The number of devices, or their transmission power, would be limited such that the interference power density they cause at the alternate service transceiver is below an agreed threshold. This threshold could be determined, for example by considering the sensitivity of the alternate service receiver to the aggregate power from the mobile stations in the protected region. The application of the aspects of the present disclosure to these scenarios may be extended to include a density manager in the network. This density manager would monitor the number of mobile stations operating in the protected zones, and limit their number or aggregate transit power to keep the interference power seen by the alternate service transceiver below the agreed threshold. This density manager could restrict the number of mobile stations allowed to register in the cells with special transmission codes. Alternatively, the density manager could restrict the power transmitted by each device in the cells with special transmission codes. These restrictions, for example could be achieved through limitations on the number of resource blocks and maximum power levels or data rates for each of the mobiles devices operating in the cell. The density manager may be an internal part of a base station or may be a separate server (not shown) that is accessed via communication network 130.

The arrangement with the density manager as a server in the network has the advantage that it may take into consideration the activity in multiple cells and thereby balance traffic across a wide area, including the opportunity to handover some traffic between cells, or to other radio frequency channels, to reduce the density in some areas. An arrangement with the density manager associated with each cell (base station) however enables local management and lesser complexity of communications and inter-cell operations planning.

Mobile Platform Operations

In some scenarios it may be desirable for mobile stations that are on a mobile platform, such as a road vehicle, a train, or an aircraft to use base stations that are associated with the mobile platform. These base stations may be located on the mobile platform and moving with it, or they may be special base stations that are along the path (i.e., road, train track) of the mobile platform and designated for use by the mobile stations associated with the mobile platform. The techniques of the present disclosure may be utilized to facilitate improved services for mobile stations while travelling on a mobile platform. The advantage of using the methods of this disclosure is that the mobiles travelling on the mobile platform are not required to individually perform mobility handover among the fixed network bases stations as they travel along their route.

In some operating scenarios, the mobile platform may be equipped with base stations to handle the traffic of mobile stations travelling with the platform. In this scenario it is desirable for the onboard base stations to capture and service the traffic from the mobile stations on board while the mobile traffic is moving and to facilitate handovers to and from the fixed network base stations at appropriate times and places when the mobile platform is at rest in stations or terminals.

Figure 6:
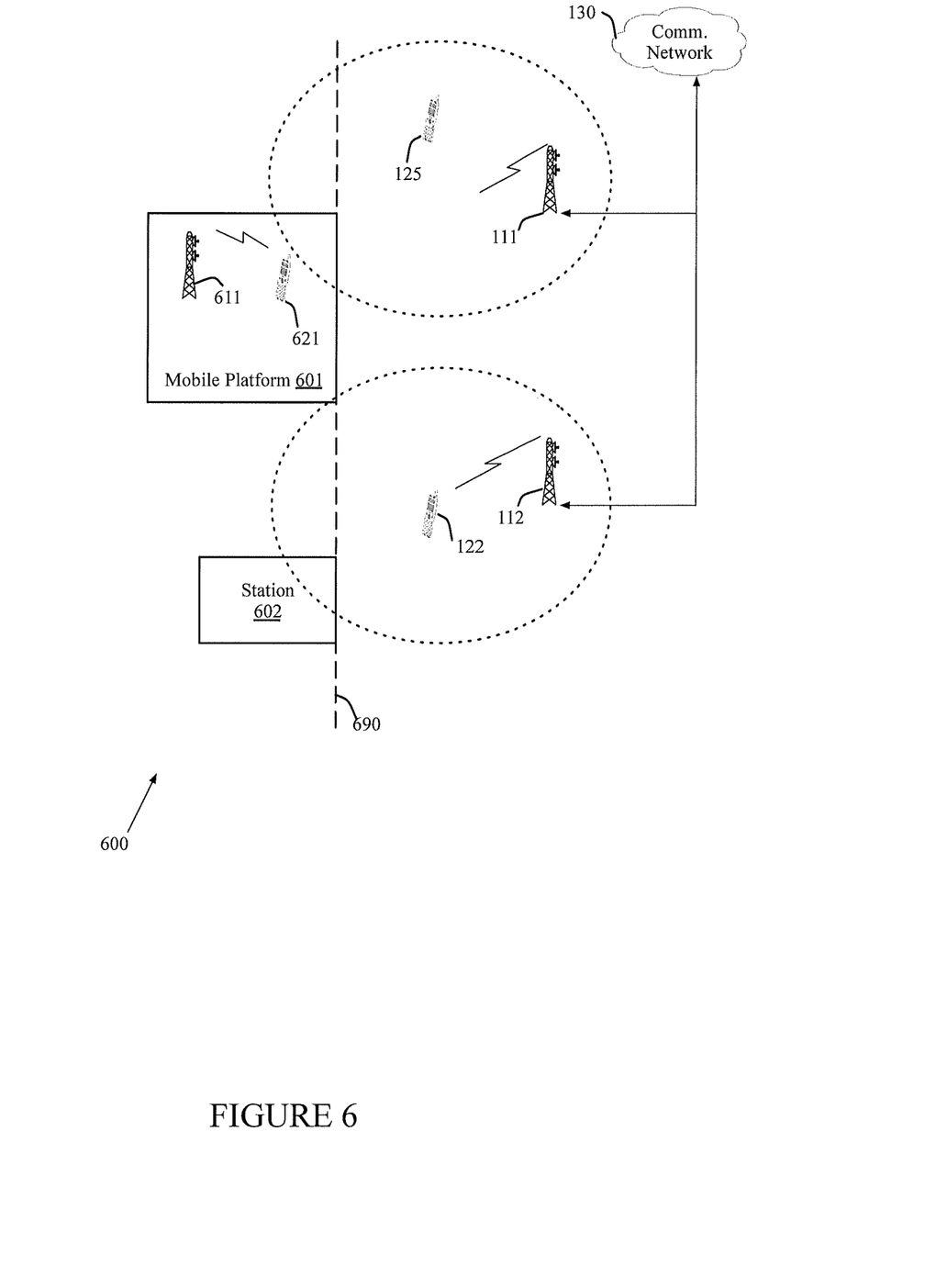
FIG. 6 illustrates a mobile platform with an included base station and an onboard mobile station according to one embodiment.

FIG. 6 illustrates mobile platform 601 with included base station 611 and onboard mobile station 621 according to one embodiment. Mobile platform 601 travels along path 690 towards station 602 and traverses the coverage areas of fixed base stations 111 and 112. The mobile platform base station 611 is equipped to provide special transmission codes that may be recognized by mobile station 623 on mobile platform 601. In an embodiment, mobile platform base station 611 may transmit one of two special transmission codes. One code is transmitted while mobile platform 601 is in motion and the other code is transmitted while platform 601 is stopped at station 602 or in other circumstances when it is appropriate for onboard mobile station 621 to handover to and from fixed base stations 111 and 112.

In an embodiment in which the system utilizes closed subscriber (CSG) codes to indicate the special mobile operation, mobile platform 601 utilizes one CSG code while in motion and another CSG code while stopped in places where mobile station 621 may transfer from mobile platform base station 611 to nearby fixed base stations.

A mobile station capable of utilising mobile platform base station 611 (i.e., a member of the closed subscriber group) would be captured by mobile platform base station 611 if it was utilising the stationary special code and mobile base station 611 was of sufficient signal strength. When mobile platform 601 was in motion, mobile platform base station 611 would change to the mobile special code and this would indicate to the onboard mobile station 621 that it should remain connected to mobile platform 611 and not handover to other outside stationary base stations that may be along the path of mobile platform 601. When mobile platform 601 is at rest at again it would switch to the stationary special code, which would signal that the mobile station, which may be departing the mobile platform, may handover to the fixed base stations when their signal strength becomes greater as the mobile station leaves the mobile platform. In an embodiment, the mobile platform would change from one closed subscriber group code to another as it moves and stops along its route.

As a further feature, the stationary closed subscriber group code could be indicative of the station the mobile platform has reached (e.g., a different code for each station 602). The mobile station may use this indicative code to signal to the user the current location in the journey. In a further embodiment, the mobile station could be triggered to alert the user that it is now the time and place to alight from the mobile platform. For users travelling in a foreign country for example, this may be preferable to reading onboard mobile platform signs or passing station name-boards in a foreign language.

In some embodiments it may be advantageous to locate the mobile network base stations at fixed locations outside the mobile platform but dedicated to the specialties of the mobile platform environment. In this scenario, the base station coverage would be directed along the path of the mobile platform path and configured to accommodate the speed of the mobile platform and handover of the mobile platform's traffic between fixed cells. This alternate arrangement of serving mobile platform users is illustrated in FIG. 7.

Figure 7:
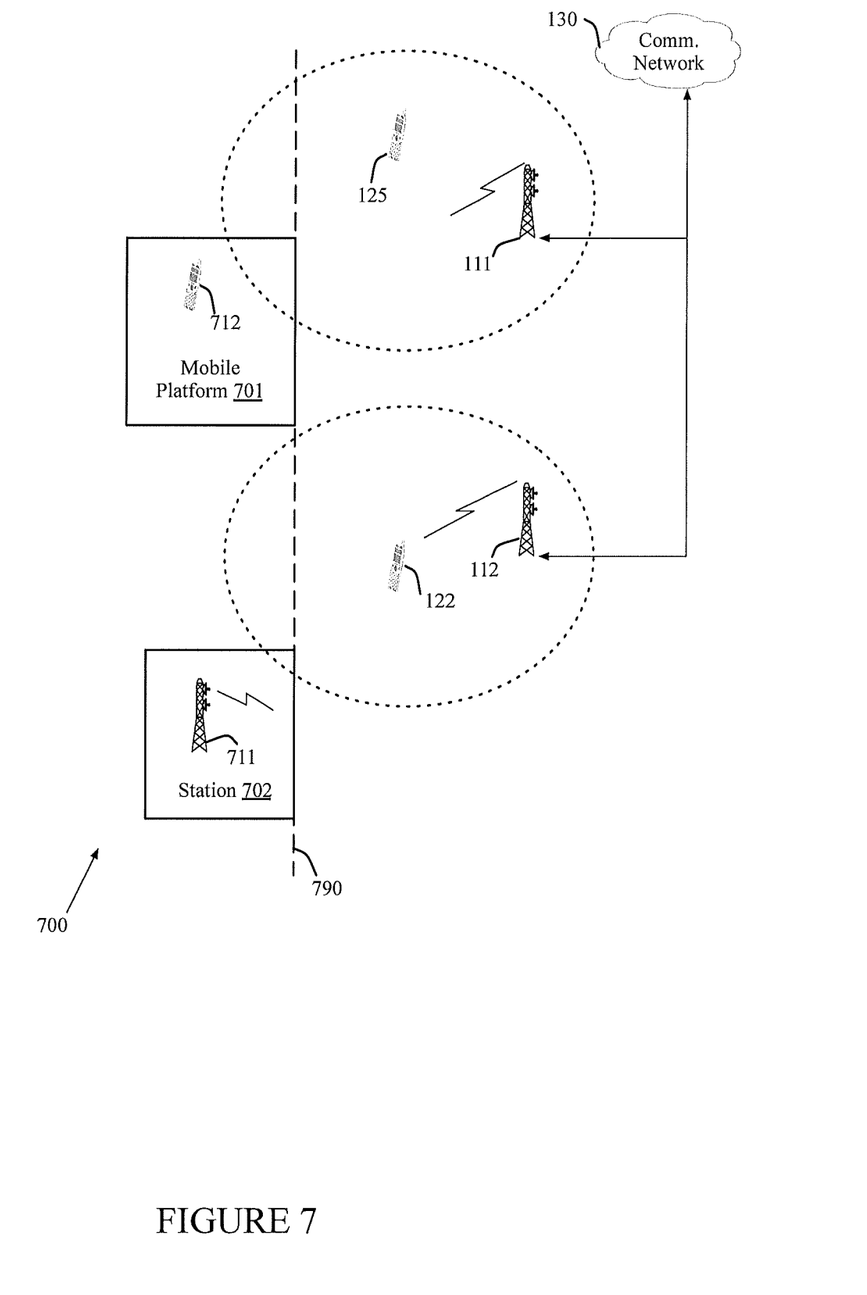
FIG. 7 illustrates a mobile platform and a mobile platform station with an included base station according to one embodiment.

FIG. 7 illustrates mobile platform 701 and mobile platform station 702 with an included base station 711 according to one embodiment. In this configuration, base station 711 transmits special codes at station 702. These are arranged to cover mobile platform 701 while it is in station 701. A mobile station capable of recognizing the special codes will transfer to base station 711 if it boards mobile platform 701 at station 702. When mobile platform 701 leaves the station 702, the mobile stations on board handover to the external fixed base stations (i.e., BS 111, 112) that cover path 790 of mobile platform 701. This handover may be directed by base station 711 as mobile platform 701 leaves station 702.

The external fixed base stations also transmit special transmission codes indicative of their service for mobile platform users. When mobile platform 701 reaches another station 702, the user of a mobile station may alight at which point the mobile station will be handed over to base station 711 at the new station. In an embodiment the special transmission codes of the mobile platform system may make use of closed subscriber group codes to identify the appropriate base stations for operation by the mobile station as it joins the mobile platform, makes its journey and alights at another station.

Figure 8:
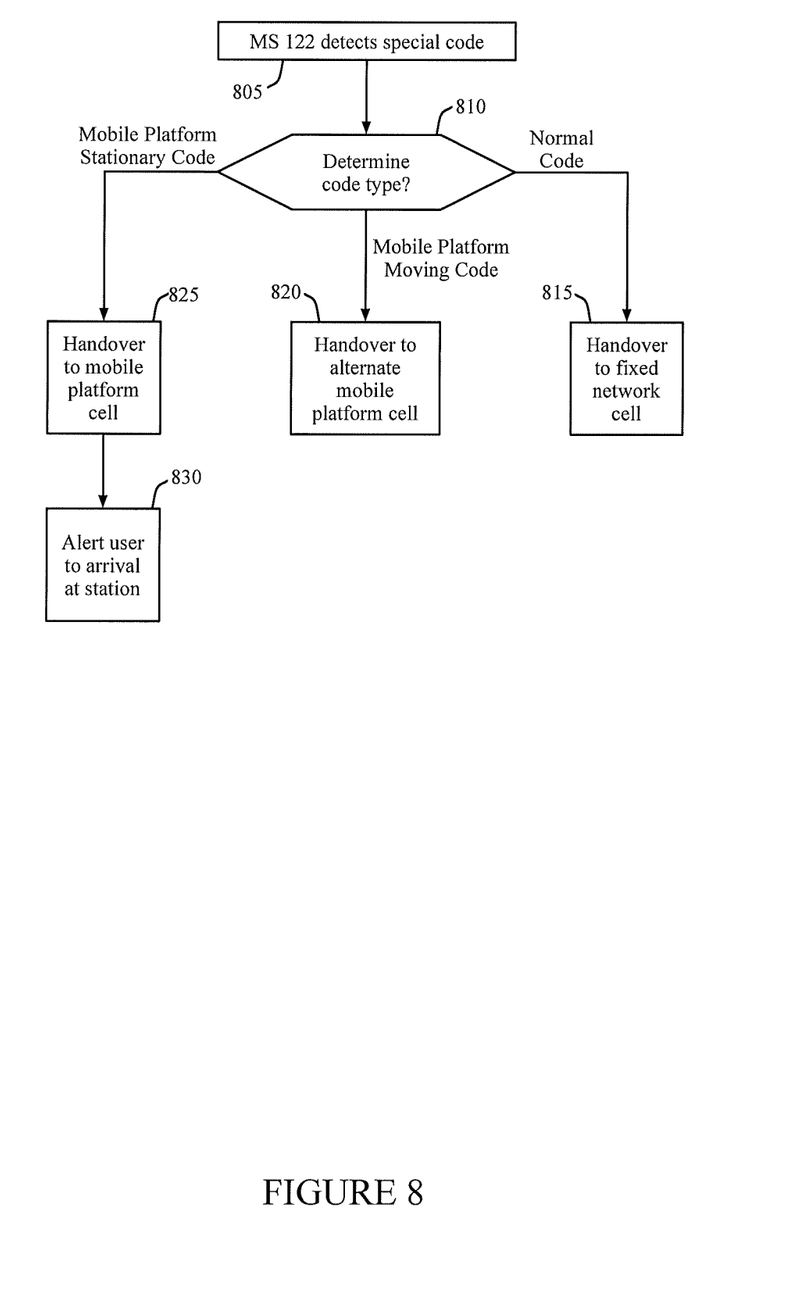
FIG. 8 is a flow diagram illustrating the operation of an exemplary mobile station according to another embodiment of the present disclosure.

FIG. 8 depicts flow diagram 800, which illustrates the operation of exemplary mobile station 122 as MS 122 enters and leaves the mobile platform network operation according to another embodiment of the present disclosure. Initially, MS 122 detects a special code transmitted by a base station (step 805). Next, MS 122 determines the code type (step 810). The code may be a normal code from a fixed base station. Alternatively, the special code may be associated with a base station in a stationary mobile platform. The special code also may be associated with a base station in a moving mobile platform.

If the detected code is normal in step 810, then MS 122 may handover to a fixed network cell, such as BS 111 (step 815). If the detected code is for a moving mobile platform base station, then MS 122 may handover to alternate mobile platform station cell as the mobile platform moves (step 820). If the detected code is for a stationary mobile platform, then MS 122 may handover to the base station of the station in which the mobile platform is currently located (step 825). MS 122 then alerts the user that the user has arrived at the station.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a mobile station, a method comprising:
receiving a code transmitted by a first base station, the transmitted code associated with a restricted area;
in response to receipt of the transmitted code, determining a position of the mobile station;
comparing the position of the mobile station to the restricted area;
determining whether the mobile station is in the restricted area or a permitted area;
in response to a determination that the mobile station is in the restricted area:
refraining from transmitting using protected channels associated with a protected base station in the restricted area, wherein the restricted area overlaps a coverage area provided by the protected base station; and
transmitting using an alternative channel if the alternative channel is available in the restricted area, wherein the transmitted code identifies the alternative channel; and
in response to a determination the mobile station is in the permitted area, accessing the first base station using one of the protected channels,
wherein the protected base station is operated by a different service carrier than the first base station, wherein the protected channel is selected from a plurality of radio frequency (RF) channels that are shared by the first base station and the protected base station in order to provide disparate radio services to mobile stations in the permitted and restricted areas, respectively, and wherein the permitted area does not overlap the restricted area.

2. The method as set forth in claim 1, wherein the method further comprises:
in response to a determination by the mobile station that the alternative channel is not available in the restricted area, searching for a second base station to access in a different location, wherein the restricted area comprises a cell designated as a closed subscriber group (CSG) to which access is limited to mobile stations registered with the CSG.

3. The method as set forth in claim 1, wherein the method further comprises:
obtaining information associated with a border of the restricted area.

4. The method as set forth in claim 3, wherein obtaining the border information comprises receiving the border information from a base station.

5. The method as set forth in claim 3, wherein obtaining the border information comprises accessing a database and retrieving the border information from the database.

6. The method as set forth in claim 5, wherein the database is internal to the mobile station.

7. The method as set forth in claim 5, wherein the database is external to the mobile station.

8. For use in a wireless network, a mobile station configured to:
receive a code transmitted by a first base station, the transmitted code associated with a restricted area;
in response to receipt of the transmitted code, determine a position of the mobile station;
compare the position of the mobile station to the restricted area;
determine whether the mobile station is in the restricted area or a permitted area;
in response to a determination that the mobile station is in the restricted area:
refrain from transmitting using protected channels associated with a protected base station in the restricted area, wherein the restricted area overlaps a coverage area provided by the protected base station; and
transmit using an alternative channel if the alternative channel is available, wherein the transmitted code identifies the alternative channel; and
in response to determination the mobile station is in the permitted area, access the first base station using one of the protected channels,
wherein the protected base station is operated by a different service carrier than the first base station, wherein the protected channel is selected from a plurality of radio frequency (RF) channels that are shared by the first base station and the protected base station in order to provide disparate radio services to mobile stations in the permitted and restricted areas, respectively, and wherein the permitted area does not overlap the restricted area.

9. The mobile station as set forth in claim 8, wherein the mobile station is further configured to:
in response to a determination by the mobile station that the alternative channel is not available in the restricted area, search for a second base station to access in a different location,
wherein the restricted area comprises a cell designated as a closed subscriber group (CSG) to which access is limited to mobile stations registered with the CSG.

10. The mobile station as set forth in claim 8, wherein the mobile station is further configured to:
obtain information associated with a border of the restricted area.

11. The mobile station as set forth in claim 10, wherein the mobile station obtains the border information by receiving the border information from a base station.

12. The mobile station as set forth in claim 10, wherein the mobile station obtains the border information by accessing a database and retrieving the border information from the database.

13. The mobile station as set forth in claim 12, wherein the database is internal to the mobile station.

14. The mobile station as set forth in claim 12, wherein the database is external to the mobile station.

15. For use in a wireless network, a base station configured to transmit a code to a mobile station, wherein the code is associated with a restricted area and wherein receipt of the code by the mobile station is operable to cause the mobile station to: i) determine a position of the mobile station, ii) compare the position of the mobile station to the restricted area to determine whether the mobile station is in the restricted area or a permitted area and, in response to a determination that the mobile station is in the restricted area, iii) refrain from transmitting using protected channels associated with a protected base station in the restricted area, wherein the restricted area overlaps a coverage area provided by the protected base station, and iv) transmit using an alternative channel if the alternative channel is available, wherein the transmitted code identifies the alternative channel,
wherein the protected base station is operated by a different service carrier than the base station, wherein the protected channel is selected from a plurality of radio frequency (RF) channels that are shared by the base station and the protected base station in order to provide disparate radio services to mobile stations in the permitted and restricted areas, respectively, and wherein the permitted area does not overlap the restricted area.

16. The base station as set forth in claim 15, wherein the base station is further configured to transmit to the mobile station information associated with a border of the restricted area.

17. For use in a base station of a wireless network, a method comprising transmitting a code to a mobile station, wherein the code is associated with a restricted area and wherein receipt of the code by the mobile station is operable to cause the mobile station to: i) determine a position of the mobile station, ii) compare the position of the mobile station to the restricted area to determine whether the mobile station is in the restricted area or a permitted area and, in response to a determination that the mobile station is in the restricted area, iii) refrain from transmitting using protected channels associated with a protected base station in the restricted area, wherein the restricted area overlaps a coverage area provided by the protected base station, and iv) transmit using an alternative channel if the alternative channel is available, wherein the transmitted code identifies the alternative channel, wherein the protected base station is operated by a different service carrier than the base station, wherein the protected channel is selected from a plurality of radio frequency (RF) channels that are shared by the base station and the protected base station in order to provide disparate radio services to mobile stations in the permitted and restricted areas, respectively, and wherein the permitted area does not overlap the restricted area.

18. The method as set forth in claim 17, further comprising transmitting to the mobile station information associated with a border of the restricted area.

19. The method as set forth in claim 17, wherein the base station operates on a mobile platform containing a plurality of mobile stations travelling on the mobile platform, wherein the base station is configured to transmit a second code to the plurality of mobile stations while the mobile platform is in motion, the second code instructing each mobile station to remain connected to the base station and to avoid handovers to other base stations located along a path traversed by the mobile platform.

20. The method as set forth in claim 19, wherein the base station is configured to transmit a third code to the plurality of mobile stations when the mobile platform stops at a rest station, the third code instructing the plurality of mobile stations to handover to a fixed base station upon departing the mobile platform.

* * * * *